Nov. 16, 1965

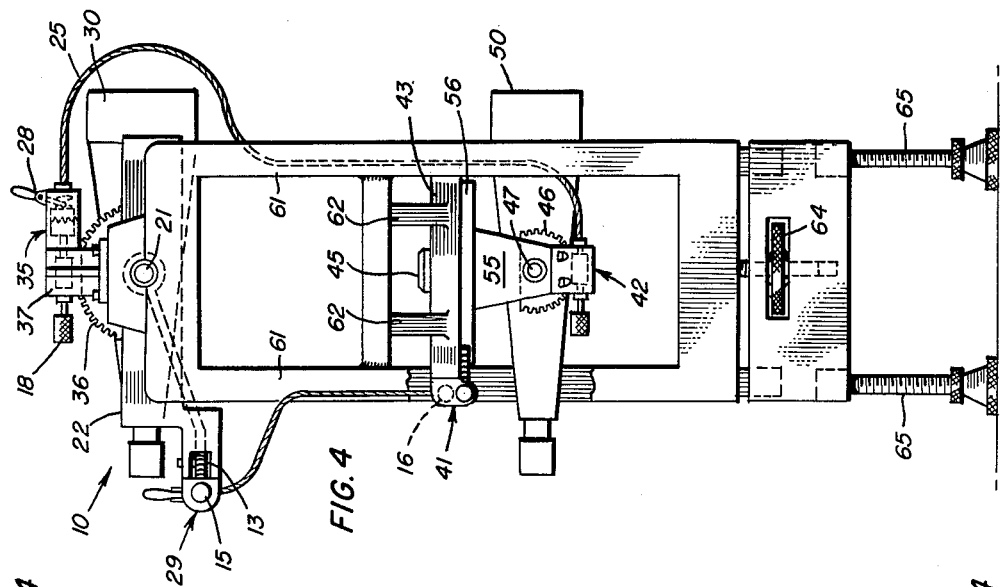
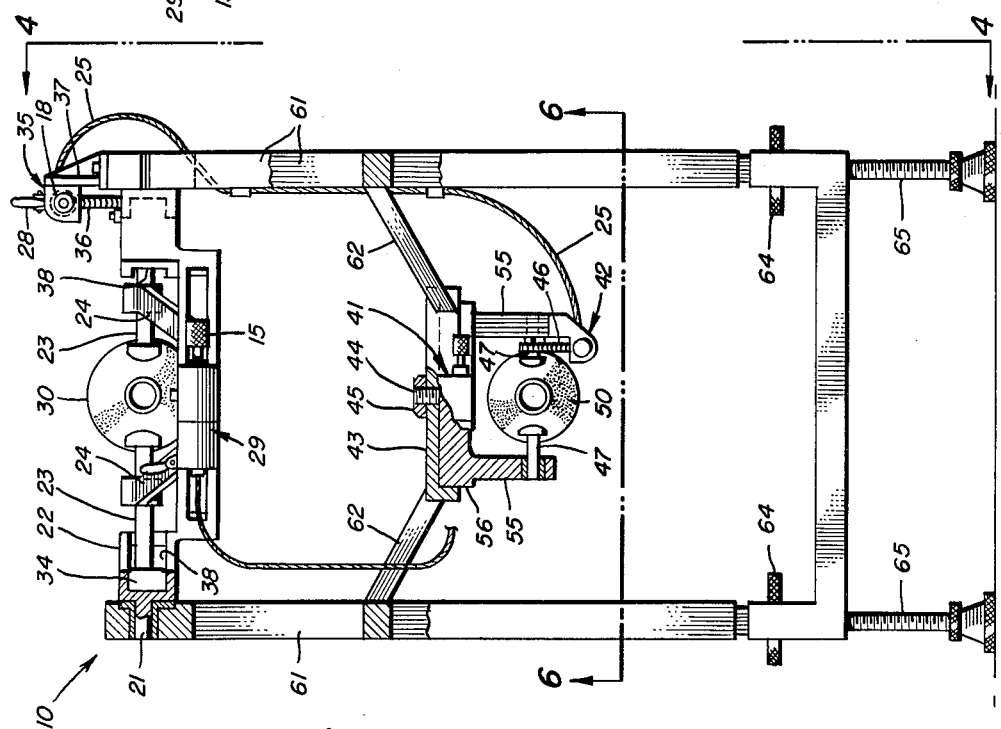

C. G. COLEMAN 3,217,413

OBLIQUE PHOTOGRAPH PLOTTER

Filed Nov. 5, 1963

United States Patent Office 3,217,413
Patented Nov. 16, 1965

3,217,413
OBLIQUE PHOTOGRAPH PLOTTER
Charles G. Coleman, 6712 Joallen Drive,
Falls Church, Va.
Filed Nov. 5, 1963, Ser. No. 321,652
15 Claims. (Cl. 33—1)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of application Serial No. 14,158 filed March 10, 1960, now abandoned.

The present invention relates to an oblique photograph plotter. More particularly, the invention relates to a novel technique for translation or rectification of points on an oblique photograph of the earth's surface for observation in proper or true plan relationship on a map or other plan projection.

The invention embodies a new instrument based on the photo alidade principle which incorporates several completely new elements. The rectification of an observable point or object, appearing in a distorted relationship on a photograph, to a true or undistorted projection on a map may be accomplished by the present invention by the use of two alidades mounted on a single frame and disposed in either of two alternative arrangements wherein one alidade is located above the other or wherein they are positioned in a side by side relationship. One of the alidades, hereinafter referred to as the photo scope, is used to scan a photograph to permit the taking of readings indicative of depression and/or azimuth angles about the point of mounting of the photo scope. The other alidade, hereinafter referred to as the plotting scope, is utilized to permit sightings upon a horizontally placed map or plotting paper, which sightings when marked on the map or plotting paper represent a plan view of the objects appearing on the photograph as sighted through the photo scope.

There are several general prior art categories of methods for rectifying information from oblique photographs. Some of these methods are as follows:

(1) In analytical methods the distances between points are measured directly on the oblique, then the true positions and distances are calculated using geometrical formulae.

(2) Graphic rectification systems are also in use in which points and distances are translated from the oblique view to the vertical by means of graphic perspective construction. Certain of these graphic methods have been incorporated into equipment generally designated as "perspective drawing devices" or "oblique plotters."

(3) Photographic rectification is performed by projecting a negative of the oblique photograph on an easel tilted at the proper angle so that the resulting projected print constitutes a true vertical projection.

(4) A fourth means of obtaining oblique solutions is found in the family of instruments in which an alidade or similar surveying type device is used to physically measure the angles between lines of sight on the oblique view. In such methods an alidade is set up at the focal distance from the photograph. The photograph is oriented at the precise depression angle from the horizontal which the camera had at the time of exposure, and the actual vertical angles downward from the horizon and laterally from the principal point of the photograph are measured by fixing the crosshairs of the sighting device on the points in the photo image and reading the angles.

Analytical and graphical rectification systems have the disadvantage that the rectification must be worked out indirectly (either by analysis or by graphic development of a three dimensional solution on two dimensional paper) and, therefore, are somewhat difficult to understand and subject to errors arising from confusion. It is also difficult to "reason through" the solution and see where an apparent error might have occurred. Photographic rectification, due to the fact that the equipment required is extremely large and costly and due to the fact that the product is a rectified photo print, is used primarily for mosaicing purposes. It is usually uneconomical to use this method to obtain dimensional data from oblique photography where no mosaic is required. The photo alidade, in its present forms, is impractical to use with long focal length photography unless this photography is taken nearly horizontally. Positioning the alidade at the proper angle and distance from the tilted photograph for sizable depression angles is almost an impossible accomplishment in normal office-type working space. In addition to the above disadvantages resulting from the size of the equipment necessary to perform the methods, all the methods listed, with the exception of photo rectification, present the disadvantages of being either difficult or impossible to utilize effectively, unless the conditions as to the position and altitude of the camera in space with respect to the ground, existant at the time the photographic exposures were made, are known to the operator of the plotting equipment before he undertakes the operation of the plotting or rectification apparatus.

There has been long existing need in the photo rectification art for an apparatus which is compact and portable, which can be effectively utilized to transpose the objects observable in a photograph to a plan view, which does not carry with it the planes upon which the photograph and map, respectively, will be disposed, and which need not be oriented with respect to the photograph in the same manner as the camera was oriented with respect to the photographically portrayed terrain.

The general purpose of this invention is to provide a new and novel device comprised of optical-mechanical elements of a character adapted to be combined in a novel manner to permit an operator to directly rectify points appearing on an oblique photograph for correlated transposition to a correctly rectified plan view. This invention facilitates the rectification of photographs by an operator, as do the methods aforementioned, but it does not posses the aforementioned disadvantages. The advantages of the invention are are follows: The invention contemplates the utilization of an instrument which compensates for the obliqueness of the photograph being rectified, within the instrument itself, rather than by the old photo alidade method of visually maneuvering the photo to an angle equivalent to the depression angle of the camera. The invention contemplates the use of a unique instrument, the operation of which provides for the carrying out of a method of handling very long focal length photography without a corresponding increase in the size of the instrument because the easel containing the photograph and the mount containing the alidades are two separate and moderately sized devices. Additionally, the apparatus permits of rapid alignment of the photo scope and the photograph as well as the provision of means for translating and plotting the photo image points directly onto a map or chart. It also permits correction of faulty information concerning the camera altitude, position, depression angle and/or focal length by working backwards from map control to the photograph. Finally, it permits the plottings of points as obtained from several overlapping oblique photographs to be imposed upon a single map base at any desired scale.

An object of the present invention is the provision of an improved instrument by means of which oblique photographs may be rectified to a plan view.

Another object is to provide instrumentalities by means of which intelligence appearing on oblique photographs obtained by use of long focal length objective type optics may be transferred and plotted on a plan view by direct operation.

A further object of the invention is the provision of an optical-mechanical device which enables an operator to plot points derived from an oblique photograph directly onto a plan map.

Still another object is to provide apparatus whereby exact information as to the aerial camera location, position, depression angle and focal length of the objective lens may be obtained by use of the invention in checking known map coordinates against objects appearing in an oblique photograph which correspond to the map coordinates.

Other objects and many of the attendant advantages of this invention will be readily appreciated as the same becomes better understood by reference to the following detailed description when considered in connection with the accompanying drawings wherein:

FIG. 3 is an elevational view partly in section of the preferred embodiment of the invention shown in FIG. 1;

FIG. 4 is a side elevational view taken along line 4—4 of FIG. 3;

Figure 1:
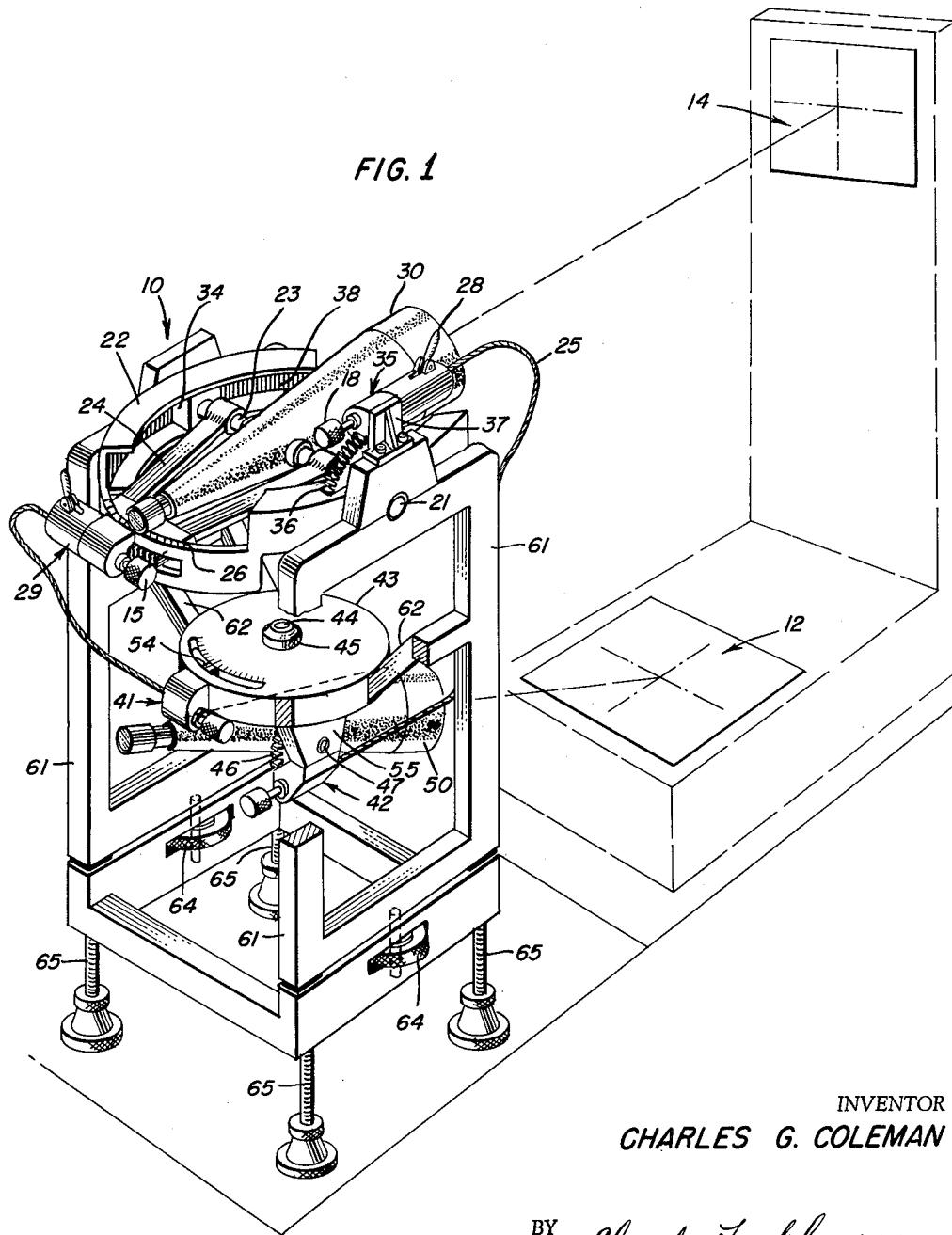
FIG. 1 shows a generally diagrammatic pictorial view of the overall arrangement of equipment used in plotting points derived from an aerial photograph or the like onto a plan map.

Referring now to the drawings, wherein like reference characters designate like or corresponding parts throughout the several views, there is shown in FIG. 1 a general view of the present invention showing the oblique photograph plotter generally at 10. The plotter is located at the proper distance from the photograph 14 with the plotting scope 50 in the proper angular relationship with the map or chart 12. The photograph 14 may be mounted on any suitable plane as may the map or chart 12 so long as the plane of the photograph 14 is perpendicular to the plane of the map 12.

A preferred embodiment of the oblique photograph plotter is shown in FIGS. 1 and 3 to 6 inclusive. The preferred embodiment shows a vertical frame 61 which supports two alidades 30 and 50. The alidade generally shown at 30 is the photo scope used to sight on the photograph 14. The photo scope 30 is mounted so as to be rotatable about vertical and horizontal axes. A circular ring segment member 22 is mounted on the frame 61 through pins 21, which are integral with the circular ring segment 22. The circular ring 22 is rotatable about the common axis of the pins 21 which are journalled so as to be rotatable in the vertical frame 61. The circular ring segment 22 has peripherally disposed arcuately extending slot-like tracks 38 disposed on its inner-circumference. The tracks 38 are in a plane which passes through the common axis of the pins 21. The photo scope 30 has integrally attached thereto an axle 23 the ends of which are disposed in the bearing blocks 34. The axle 23 is secured to the track members 34 by any well known welding or brazing method. The instant bearing blocks 34 are shown for purposes of illustration only and are utilized to support the ends of the axle 23 in a sliding relationship with the tracks 38, however, the ends of the axle 23 could also be machined to provide flat surfaces so that the axle end could slide in the tracks 38. Disposed within the circular ring segment 22 is a bearing member or brace 24 which rides upon a center circular surface of the ring segment 22 and which is secured to the axle 23. The bearing member 24 may be secured to the axle 23 in any well known manner, such as by set screws, welding, brazing, or soldering. As is evident from this description the photo scope 30 may be rotated about the horizontal axis because the entire assembly, which is carried by the circular ring segment 22, pivots due to the disposition of the pins 21. Also, it is clear that the photo scope 30 may be rotated about a vertical axis since the axle 23 may be moved along the tracks 38. To facilitate the precise rotation of the photo scope 30 in either plane, precision drives 29 and 35, each of which is comprised of a helical worm or screw and its associated worm wheel segment, are utilized. The precision drive 29, as is more clearly shown in FIG. 5, utilizes a helical screw 11 which is disposed within a housing attached to the circular ring segment 22. The helical screw 11 intermeshes with the threads 13 which are disposed on the bearing member 24. The helical screw 11 is driven by the knob 15. Disposed on the circular ring segment 22 are indicia 26 which indicate angles in degrees and which are used in conjunction with an index pointer disposed on the bearing member 24 to indicate the number of degrees of rotation of the photo scope 30 with respect to the ring segment 22. In the event a greater degree of precision is desired as to the graduations utilized with the index pointer, it is considered to be within the skill of one practiced in this art to provide a vernier type scale in order to facilitate readout to either decimal parts of a degree or minutes of arc or the like. In a similar manner, vernier or otherwise calibrated precision drive 35 rotates the photo scope 30 about the axis of the pins 21. A semicircular worm segment member 36 is attached to the ring segment 22. On the circumference of the vertically disposed drive member 36 are worm wheel teeth which mesh with the helical screw of the worm drive 35. The housing of the worm drive 35 is secured to the vertical frame 61 by the brace or support 37. Upon rotation of the knob 18 the helical screw within the housing rotates in continuous engagement with the worm wheel teeth on the drive member 36 to rotate the worm wheel member 36, which in turn causes the ring segment 22 to be rotated about the axis of the pins 21. The drive member 36 also has indicia thereon which may if desired include a vernier type calibration arrangement to indicate the number of degrees and/or parts thereof of rotation in a vertical plane that the circular ring 22 has been rotated.

The plotting scope 50 is supported by the vertical frame 61 through the spar members 62 and disc 43. A telescope or plotting scope support member 56 is rotatably mounted to the disc 43 by a threaded stud 44 which is integral with the support 56 and which receives a nut 45. Extending from the telescope or plotting scope support member 56 and integral therewith are vertically extending ears 55. Journalled into the ears 55 are the ends of the axle 47. Also attached to the end of one of the ears 55 is the precision drive mechanism 42 which houses a helical screw which engages the circular worm wheel element 46. The circular element 46 is integral with or secured by welding, brazing or soldering to the axle 47. The circular element 46 also may have indicia thereon including a vernier scale, if desired, to indicate the angular movement of the photo scope about the axis of the axle 47. The precision drive mechanism 41 is supported by the disc member 43 and houses a helical screw which engages mating threads which are disposed on the plotting scope support member 56. The plotting scope support member 56 also may have an index thereon of either a single indicia type or of a vernier type to indicate the number of degrees of rotation of the plotting scope about the vertical axis by alignment with the calibrated indicia on the disc 43. To afford vertical adjustment of the frame 61, the adjustment members 65 are provided. The adjustments 65 are threadedly secured within the frame 61 and may be rotatably turned so as to move into and out of the frame 61 thereby changing the vertical height of the frame 61.

In the operation of the device the photo scope 30 is sighted upon a designated object in a photograph and the plotting scope 50 is sighted upon the coordinates on a map which represents the position of the object shown in the photograph. By moving the photo scope 30 through an angle to view a second object in the photograph, the coordinates of the second object so sighted in the photograph may be determined on a map by moving the plotting scope 50 the same angular number of degrees about the vertical and horizontal axes as the photo scope was angularly moved about its vertical and horizontal axes in moving from a sighting of the known object to a sighting of the second object. The movement of the plotting scope the same number of degrees as the photo scope may be accomplished manually by reading the number of degrees moved by the photo scope on the indicators for drive assemblies 29 and 35 and subsequently rotating the plotting scope the same number of degrees by utilizing the drive assemblies 41 and 42. Alternatively, the drive mechanisms may be connected together by means of a cable 25. The cable may be utilized as shown to rotate the helical screw housed within the drive mechanism 42 as the helical screw housed within the drive mechanism 35 is rotated. When a drive, such as the cable 25, is utilized it is necessary to provide for initial adjustment of the photo scope 30 without movement of the plotting scope 50. To accomplish this ability to move the photo scope 30 without moving the plotting scope 50, the cable must not be connected to the drive mechanism 35 or, alternatively, a clutch 28 must be utilized to engage and disengage the cable from the drive mechanism 35. In a like manner a cable may be utilized to drivingly interconnect the drive mechanism 29 with the drive mechanism 41. It is noted, however, that to accomplish the desired rotation of the drive mechanism 41 corresponding to the rotation of the drive mechanism 26, the gear system 16 must be utilized.

Figure 2:
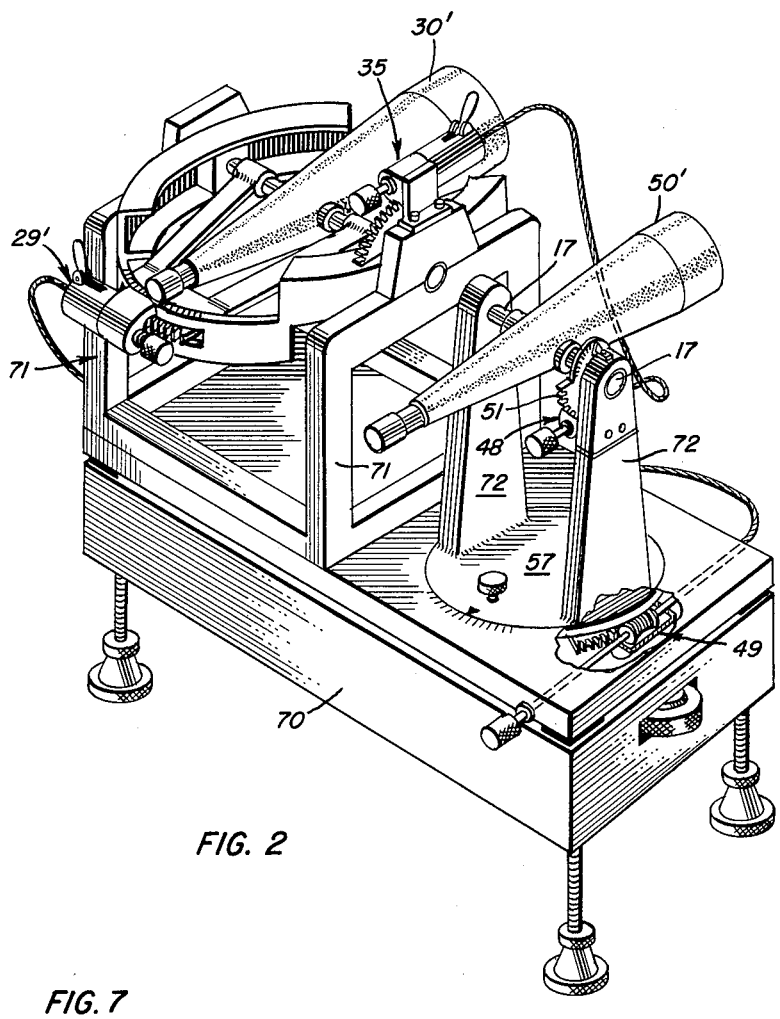
FIG. 2 shows a generally diagrammatic view of a modification of the invention wherein the alidades are mounted side by side.
Figure 7:
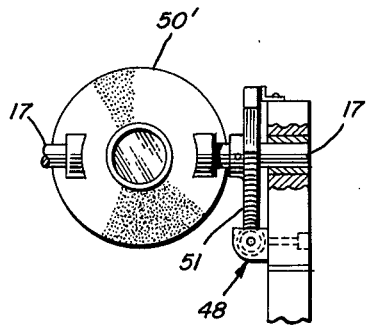
FIG. 7 is an elevational view of the worm and worm wheel drive assembly of FIG. 2.
Figure 8:
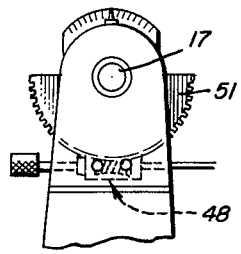
FIG. 8 is an elevational view of the worm and worm wheel drive assembly of FIG. 2.
Figure 5:
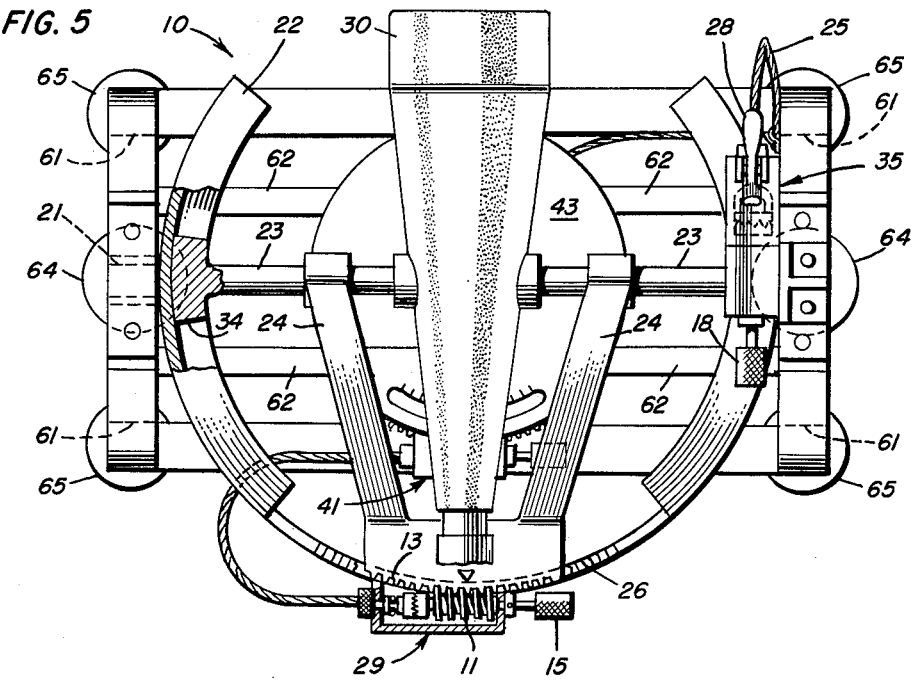
FIG. 5 is a plan view of the embodiment shown in FIG. 3.
Figure 6:
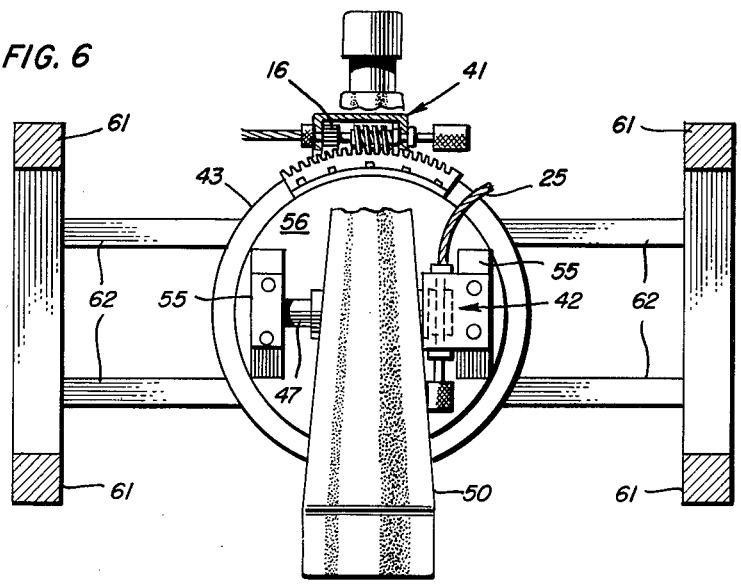
FIG. 6 is a sectional view taken along line 6—6 of FIG. 3.

In FIG. 2 a modified arrangement of the present invention is illustrated in which the photo scope 30′ is mounted horizontally of the plotting scope 50′ on a base member 70. The details of the embodiment disclosed in FIG. 2 are analogous to those shown in FIGS. 1 and 3 to 6. The photo scope 30′ is supported by an arcuate segment which is in turn supported by a vertical support member 71. The drive mechanism 29′ shown in the embodiment of FIG. 2 is the same as shown in the embodiment of FIGS. 1, 3, 4, 5, and 6, and the drive mechanism 35′ of FIG. 2 is the same as the drive 35 of FIGS. 1, 3, 4, 5, and 6. The telescope or plotting scope support member 57 is rotatably mounted within the horizontal frame 70 and has extending therefrom ears 72 which support the axle 17, which is integral with the plotting scope 50′. The alternative manner of drivingly interconnecting the photo scope 30′ with the plotting scope 50′ by cables is also shown in the embodiment illustrated in FIG. 2. The drive mechanism 48, which is more clearly shown in FIGS. 7 and 8, is secured to the support ear 72 and engages the mating threads which are disposed on the circular member 51 so as to provide rotation of the plotting scope 50 in a vertical plane. Shown in cut-away fashion is the drive mechanism 49 which is housed within the horizontal frame 70 to engage threads on the plotting scope support 57 to rotate the plotting scope 50 in a horizontal plane. It is to be understood that the flexible cables disposed within a flexible armored type housing, such for example as the well known speedometer type cables disclosed in connection with the embodiment of FIGS. 1, 3, 4, 5 and 6, are shown by way of illustration. Other mechanical driving arrangements may be utilized to drivingly interconnect the appropriate drive means of the embodiment disclosed in FIG. 2. It is also within the confines of this invention to use a telescoping drive shaft arrangement incorporating suitable universal joint type flexible connections to transmit rotational movement from one drive mechanism to another. Such an arrangement is disclosed in the aforementioned parent application.

Suitable leveling screws of a conventional design are incorporated on each of the feet for leveling and if desired for use as a fine height adjustment system wherein all screws may be rotated the same amount without materially disturbing the leveling condition of the device. A suitable gross height adjustment device of the character illustrated at 64 permit of coarse height adjustments for the device.

In carrying out the map rectification concept of this invention by means of the operation of the apparatus embodiment of the invention, a photograph indicated at 14 is utilized which has been taken by a camera, the geographic location and relative spatial orientation of which camera is known with respect to the topography or land of interest. The map 12 which is to be used for control purposes is placed on a plane surface in a perpendicular relationship to the plane of the photograph. The plotting scope 50 or 50′ is so disposed as to have the same angular orientation with respect to the map 12 as the camera which took the photograph 14 had with respect to the object shown in the photograph. The photo scope 30 or 30′ is leveled so that the photograph 14 may be sighted upon by the photo scope 30 in a line of sight which is perpendicular to the photograph. The distance between the photograph 14 and the optical center of the photo scope 30 is equal to the focal length of the objective or lens of the aerial camera used to take the photograph. After the operator has established a proper correlation between the line of sight of the photo scope 30 and the line of sight of the plotting scope 50, the photo scope 30 may be moved from a sighting upon a known object in the photograph to a sighting upon a second object in the photograph. Thereupon the plotting scope, having been sighted at the coordinates on the map of the known object shown in the photograph, may be moved the same number of degrees in the vertical and horizontal planes as the photoscope was moved in changing from a sighting of the known object to a sighting of the second object. This will result in a sighting at the coordinates on the map by the plotting scope for rectification by establishment of a second point on the map, which point is correlated to the second object shown in the photograph. The precise angular movements of the plotting scope 50 in correspondence to the angular movements of the photo scope 30 are accomplished by the various precision drive mechanisms 29, 35, 41, and 42, and may be accomplished with or without the cable drives. This manipulation of the respective scopes is repeated so long as additional points are required to be determined on the map.

The present invention also may be utilized when the orientation of the camera with respect to the earth is not known. If a photograph is available of an area disclosed by a map 12, the orientation of the camera with respect to the land may be determined and points not shown on the map but shown in the photograph may be indicated on the map. To accomplish this the photo scope 30 is sighted at an object in the photograph of which object the coordinates are known on the map 12. The plotting scope is then sighted at the known coordinates on the map 12 of the object sighted in the photograph. The photo scope 30 is then moved to a second object in the photograph of which the coordinates on the map are known. The plotting scope is then moved an equal number of degrees in the vertical and horizontal planes as the photo scope was moved in angularly moving the line of sight from the first sighted object in the photograph to the second sighted object in the photograph. At the end of this movement the plotting scope 50 is directed in a manner to facilitate the sighting upon the coordinates of the second object. If the plotting scope is not then directed for sighting the known coordinates of the second object viewed by the photo scope then the map 12 is not in the correct position with respect to the plotting scope 50 and the amount of error will provide an indication as to which direction to move the map. The map is then moved and the procedure is repeated until a movement of the photo scope from a first object in the photograph to a second object in the photograph with a corresponding movement of the plotting scope 50 through the same number of degrees of arc will result in the sighting on the map of the coordinates of the second object. Once this has been accomplished the orientation of the camera with respect to the land is established and any objects shown in the photograph of which the coordinates are not shown on the map may be rectified to the map by moving the plotting scope in unison with the photo scope.

Obviously many modifications and variations of the present invention are possible in the light of the above teachings. It is therefore to be understood that within the scope of the appended claims the invention may be practiced otherwise than as specifically described.

What is claimed is:

1. An instrument for rectifying oblique photographs comprising;
   a frame,
   a first telescope,
   first mounting means interconnecting said frame and said first telescope for providing respective movement relative to said frame in each of two perpendicular planes,
   a second telescope,
   second mounting means interconnecting said frame and said second telescope for providing respective movement relative to said frame in each of two planes which are respectively parallel to respective ones of said first mentioned perpendicular planes and
   drive means connectable so said first telescope and second telescope respectively for providing movement of said second telescope equal to the angular movement of said first telescope upon actuation of said drive means, the relative orientation of the optical axes of said first and second telescopes being adjustable relative to one another whereby, with the angle between the optical axes of the two telescopes set to a predetermined function of the angle of tilt of said photograph, an observer-operator may successively locate a plurality of objects in said photograph on a map plane which is perpendicular to the plane of said photograph by shifting said telescope contemporaneously through the same angle to bring the optical axis of said first telescope upon a designated object in said photograph and thereafter locating the point corresponding to said object on the map plane by sighting through said second telescope.

2. An instrument as claimed in claim 1 wherein;
   said first telescope is mounted on said support frame in a horizontally disposed side by side relationship with respect to said second telescope.

3. An instrument as claimed in claim 1 wherein;
   said first telescope is mounted on said support frame vertically above said second telescope to provide an over-and-under relationship between the two telescopes.

4. An instrument for rectifying a photograph taken at an oblique angle comprising;
   a support frame,
   a track member rotatably connected to said support frame for angular movement in a vertical plane,
   a bearing member rotatably supported by said track member for rotatable movement respective to said track member,
   a first telescope connected to said bearing member,
   a telescope support rotatably connected to said support frame for rotation relative to said support frame in a horizontal plane,
   a second telescope rotatably connected to said telescope support for rotation relative to said telescope support in a plane perpendicular to said horizontal plane, and
   drive means normally connected to said first telescope and said second telescope respectively for providing precise angular movement of said second telescope equal to the angular movement of said first telescope upon actuation of said drive means.

5. An instrument as claimed in claim 4 wherein;
   said second telescope is mounted on said support frame in a horizontally side by side relationship with respect to said first telescope.

6. An instrument as claimed in claim 4 wherein;
   said second telescope is mounted on said support frame at a location vertically below said first telescope.

7. An instrument for rectifying a photograph taken at an oblique angle comprising;
   a support frame,
   a circular track member rotatably mounted upon said support frame for angular movement in a vertical plane,
   a bearing member rotatably supported by said track member for angular movement relative to said track member,
   a first telescope connected to said bearing member,
   a telescope support rotatably connected to said support frame for angular movement relative to said support frame in a horizontal plane,
   a second telescope rotatably connected to said telescope support for angular movement relative to said telescope support in a plane perpendicular to the plane of rotation of said telescope support,
   a first precision worm and worm wheel drive means interposed between said support frame and said track member for precisely rotating said track member relative to said support frame,
   a second precision worm and worm wheel drive means interposed between said track member and said bearing member for precisely rotating said bearing member relative to said track member,
   a third precision worm and worm wheel drive means interposed between said telescope support and said support frame for precisely rotating said telescope support relative to said support frame, and
   fourth precision worm and worm wheel drive means interposed between said telescope support and said second telescope for precisely rotating said second telescope relative to said telescope support.

8. An instrument as claimed in claim 7 wherein;
   said second telescope is mounted horizontally beside said first telescope.

9. An instrument as claimed in claim 7 wherein;
   said second telescope is mounted vertically below said first telescope.

10. An instrument as set forth in claim 7 further including;
    first drive transmission means interposed between said first drive means and said fourth drive means for angularly rotating said second telescope relative to said telescope support an amount equal to the angular movement of said track member relative to said support frame,
    second drive transmission means interposed between said second drive means and said third drive means for angularly rotating said telescope support relative to said support frame an amount equal to the angular movement of said bearing member relative to said track member,
    first clutching means connected to said first drive transmission means for selectively disengaging said first drive transmission means from said first drive means, and
    second clutching means connected to said second drive transmission means for selectively disengaging said second drive transmission means from said second drive means.

11. An instrument for rectifying a photograph taken at an oblique angle comprising;
a support frame,
a circular track member rotatably mounted upon said support frame for angular movement in a vertical plane,
a bearing member rotatably supported by said track member for angular movement relative to said track member,
a first telescope connected to said bearing member,
a telescope support rotatably connected to said support frame for angular movement relative to said support frame in a horizontal plane,
a second telescope rotatably connected to said telescope support for angular movement relative to said telescope support in a plane perpendicular to the plane of rotation of said telescope support,
first drive means interposed between said support frame and said track member for rotating said track member relative to said support frame,
second drive means interposed between said track member and said bearing member for rotating said bearing member relative to said track member,
third drive means interposed between said telescope support and said support frame for rotating said telescope support relative to said support frame,
fourth drive means interposed between said telescope support and said second telescope for rotating said second telescope relative to said telescope support,
first clutch means attached to said first drive means for transmitting rotational movement from said first vernier drive means upon being engaged,
a first drive cable interposed between said first clutch means and said fourth drive means for transmitting rotational movement from said first clutch means to said fourth drive means for angularly rotating said second telescope relative to said telescope support an amount equal to the angular movement of said track member relative to said support frame, and
second clutch means attached to said second drive means for transmitting rotational movement from said second drive means upon being engaged,
a second drive cable interposed between said second clutch means and said third drive means for transmitting rotational movement from said second clutch means to said third drive means for angularly rotating said telescope support relative to said support frame an amount equal to the angular movement of said bearing member relative to said track, and
means connected to said support frame for adjusting the vertical height of said support frame.

12. An instrument as claimed in claim 11 wherein;
said second telescope is mounted vertically below said first telescope.

13. An instrument as claimed in claim 11 wherein;
said second telescope is mounted horizontally beside said first telescope.

14. An instrument for use in making plan maps from oblique photographs comprising;
a vertical frame,
two displaced pins having a common axis rotatably disposed about said axis in said frame,
an arcuate ring segment member connected to and supported by said pins,
said ring segment member having peripherally disposed arcuately extending slot like tracks therein,
said tracks being disposed in a plane passing through the common axis of said pins,
an axle having its respective ends slidably mounted in said respective tracks,
a bearing member rotatably disposed within said ring segment member in a plane parallel to the plane of said tracks,
said bearing member having extensions therefrom to the axis of said axle,
said axle being secured in said extensions of said bearing member,
a photo scope secured to said axle,
first drive means interposed between said bearing member and said ring segment member for moving said axle in said tracks by rotating said bearing member relative to said ring segment member,
second drive means interposed between said ring segment member and said vertical frame for rotating said ring segment member about said common axis of said pins,
a support circle rotatably connected to said vertical frame at a connection disposed vertically below said ring segment member,
said support circle being rotatable with respect to said vertical frame about the vertical axis passing through said connection,
vertical support ears integral with and extending from said support circle,
a plotting scope axle having its ends journaled for rotation about its axis in said support ears,
a plotting scope secured to said plotting scope axle,
first connecting means interconnecting said first drive means and said support circle for rotating said plotting scope about said vertical axis passing through said connection, and
second connecting means interconnecting said second drive means and said plotting scope axle for rotating said plotting scope about the axis of said plotting scope axle whereby the movement of said photo scope is transmitted to said plotting scope so that points on a photograph can be rectified to a map by an operator upon successive viewings of points on the photograph and the map, respectively, with said photo scope and said plotting scope.

15. An instrument for use in making plan maps from oblique photographs comprising;
a horizontal supporting frame,
a vertically extending supporting frame having two axially aligned bores formed therein mounted on said horizontal supporting frame,
an arcuate ring segment member having an upper arcuate segment and a lower arcuate segment,
pivot pins having a common axis integral with said ring member and rotatably disposed in said bores,
said upper segment having peripherally disposed arcuately extending slot like tracks,
said tracks being disposed in a plane which contains the common axis of said pivot pins,
axle means slidably mounted in said tracks,
a photo scope fixedly attached to said axle means,
first drive means disposed on said ring segment member,
brace means interconnecting said first drive means and said axle means for transmitting drive to rotate said axle means in said tracks thereby to rotate said photo scope about a vertical axis,
a second drive means interconnecting said vertical supporting frame and said ring segment member for transmitting drive to rotate said arcuate ring segment member about the common axis of said pivot pins to thereby rotate said photo scope about a horizontal axis,
a support circle rotatably mounted about a vertical axis on said horizontal support frame,
vertical support ears integral with and extending from said support circle and having axially aligned bores therein,
a plotting scope axle rotatably mounted in said bores,
a plotting scope secured to said plotting scope axle,
first driving connection means connected between said brace means and said support circle for rotating said plotting scope about a vertical axis in unison with the rotation of said photo scope about a vertical axis, and second drive connection means connected between said second drive means and said plotting scope axle for rotating said plotting scope about a horizontal axis in unison with the rotation of said photo scope about a horizontal axis whereby the rotation of said photo scope is transmitted to said plotting scope so that points on an oblique photograph can be rectified to a plan map by an operator upon successive viewings of points on the photograph and map, respectively, with said photo scope and said plotting scope.

References Cited by the Examiner
UNITED STATES PATENTS

| | | | |
|---|---|---|---|
| 398,865 | 3/1889 | Wade | 33—20 |
| 704,307 | 7/1902 | Eichenberger | 33—20 |
| 2,261,201 | 11/1941 | Wilson | 33—1 |
| 2,908,078 | 10/1959 | Sundstrom | 33—18 |
| 2,951,291 | 9/1960 | Ray | 33—1 |

LOUIS R. PRINCE, *Primary Examiner.*